No. 635,277. Patented Oct. 17, 1899.
V. C. DEVILLIERS.
PEA RAKE.
(Application filed Apr. 18, 1898.)
(No Model.) 2 Sheets—Sheet 1.
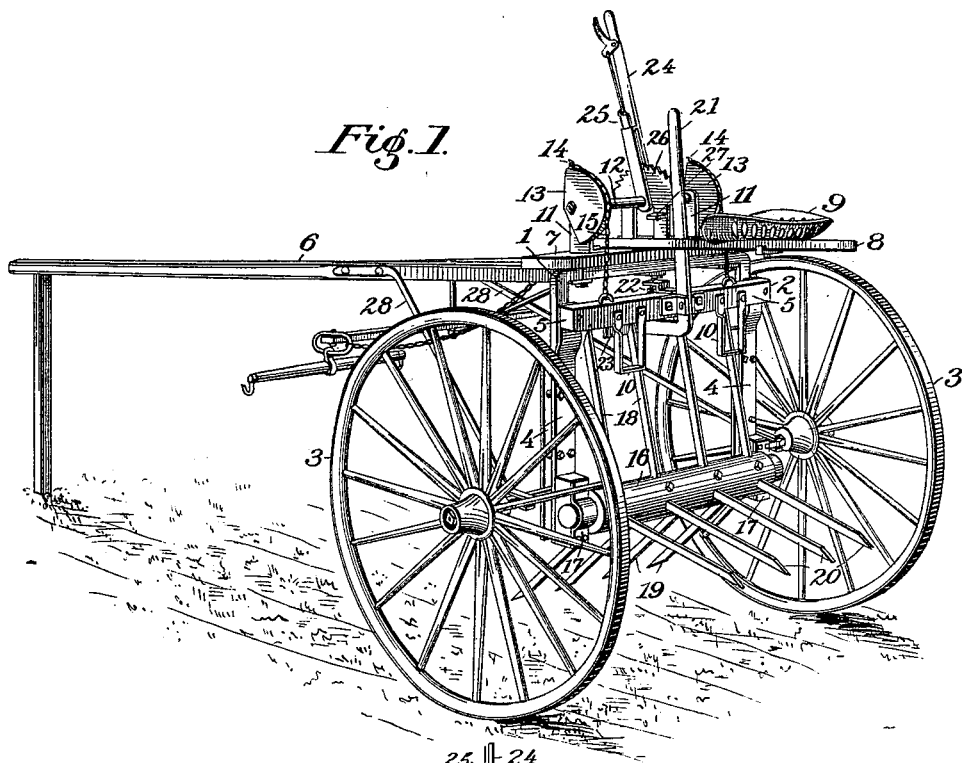
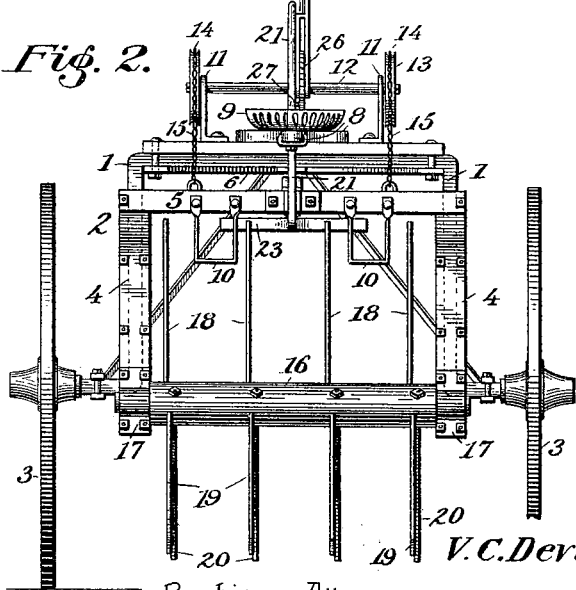
Witnesses
H. H. Simms
V. B. Hillyard
V. C. Devilliers Inventor
By his Attorneys
C. A. Snow & Co.

No. 635,277.  
V. C. DEVILLIERS.  
PEA RAKE.  
(Application filed Apr. 18, 1898.)  
Patented Oct. 17, 1899.

(No Model.) 2 Sheets—Sheet 2.

UNITED STATES PATENT OFFICE.

VILLIERS COULON DEVILLIERS, OF OPELOUSAS, LOUISIANA, ASSIGNOR TO MARIE JOSETTE MOREAU, OF SAME PLACE.

PEA-RAKE.

SPECIFICATION forming part of Letters Patent No. 635,277, dated October 17, 1899.

Application filed April 18, 1898. Serial No. 678,027. (No model.)

*To all whom it may concern:*

Be it known that I, VILLIERS COULON DEVILLIERS, a citizen of the United States, residing at Opelousas, in the parish of St. Landry and State of Louisiana, have invented a new and useful Pea-Rake, of which the following is a specification.

This invention relates to that class of rakes which are adapted to be drawn over the field by horse or other power for gathering the crop, and is designed more particularly for that class of machines for raking vines and dumping them in bunches or piles at the will of the operator.

The invention has for its object to prevent abnormal strain resulting injuriously to the operating parts and to provide for an adjustment of the operating devices, the latter being under the control of the driver at all times, whereby the height of the teeth of the rake from the ground can be adjusted and whereby the rake can be released, so as to be automatically operated by the bunch, thus releasing the latter.

The improvement relates more particularly to the general construction of the implement and to the means whereby the operating devices are placed under the control of the driver, and in order that the invention and the advantages thereof may be fully explained reference is to be had to the following description and the accompanying drawings.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 3:
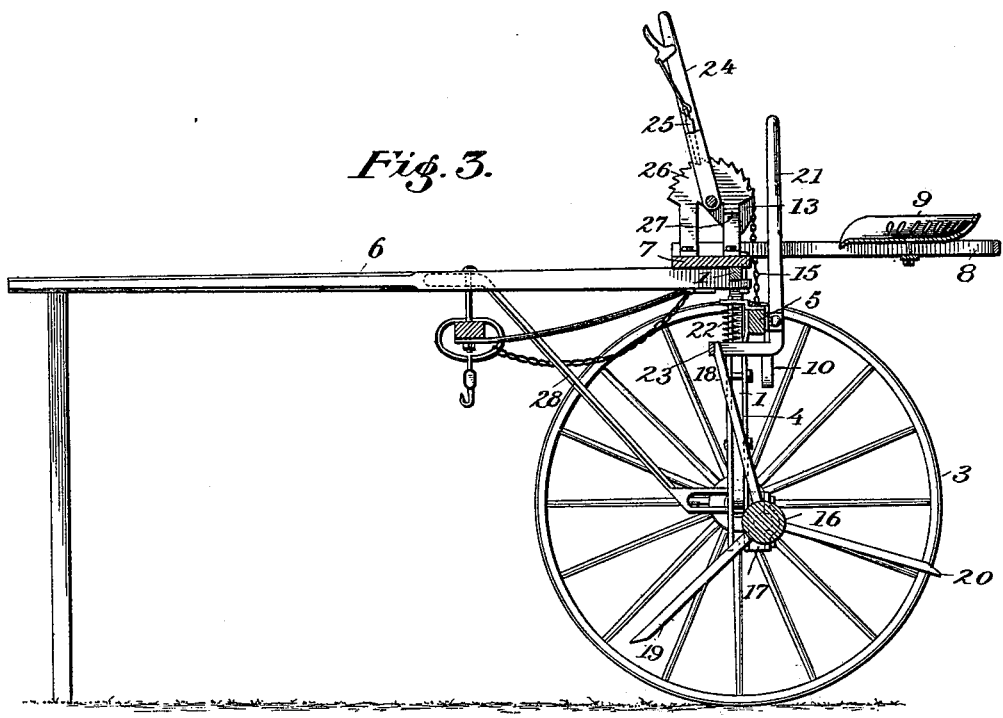
Figure 4:
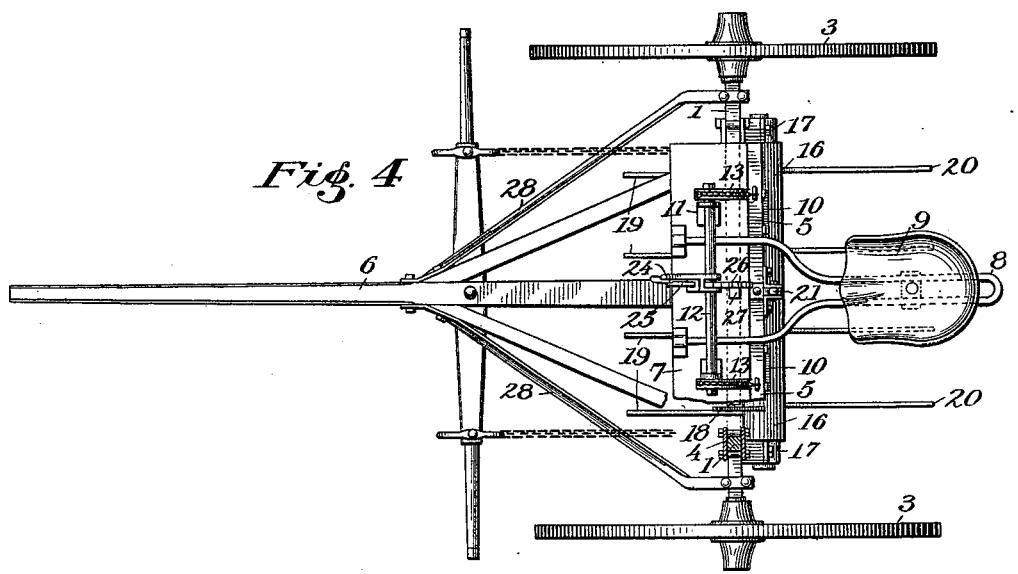

Figure 1 is a perspective view of a machine or raking implement constructed in accordance with and embodying the vital features of this invention. Fig. 2 is a rear view. Fig. 3 is a longitudinal section. Fig. 4 is a top plan view, parts being broken away.

Referring to the drawings, wherein similar numerals of reference are employed to indicate corresponding parts in the several views, the numeral 1 designates an axle forming an arch and on which an adjustable frame 2 has movement. The axle is supplied with suitable ground-wheels 3, which engage lateral extensions of the same, and the adjustable frame 2 comprises depending members 4, secured to a head 5. Attached to the upper horizontal portion of the axle-arch is a tongue 6, and on the rear portion of the same is mounted a board 7, from which rearwardly projects an elongated seat-support 8, on which a seat 9 is adjustably mounted and in convenient position for engagement with stirrups 10, attached to the head 5 and in which the driver places his feet. Rising vertically from the board 7 are bearing-standards 11, in which a transverse shaft 12 is rotatably mounted. Grooved segments 13 are secured to the ends of the shaft and have projections or hooks 14 at their front ends, to which the upper ends of chains 15 are connected. The said chains lie in the grooves of the segments and have their lower ends secured to the head 5.

Journaled to the lower ends of the depending members 4 of the adjustable frame 2 is a rotatable cylindrical rake-head 16, the end portions obtaining bearings in boxes 17, applied to the lower rear sides of the parts 4. The rake-head has three sets of teeth 18, 19, and 20, arranged radially and spaced apart equally. Fulcrumed to the rear side of the head 5 is a lever 21, which has connected thereto a coil-spring 22 for retaining it in normal position, and to the lower forward end of the said lever, below its point of attachment to the head 5, laterally-projecting arms 23 are connected. These arms extend parallel with the rake-head and are adapted to coact with the rake-teeth in a manner and for the purpose presently to be set forth.

Secured to the shaft 12 is an operating-lever 24, having a hand-operated latch 25 adapted to coöperate with a toothed segment 26 to secure the lever and the rake in an adjusted position. This lever is intended especially for raising and lowering the adjustable frame 2 and the rake-head 16. On one side of the segment 26 a safety-block 27 is secured, and consists of a piece of iron or other suitable material bearing a stop. The object of this stop is to limit the movement of the lever 24 should the latter slip from the operator's hand. When the said lever is on the stop 27, the frame 2 is lowered in position to pull over level ground and can be lifted a considerable distance. In this adjustment the operator simply pushes the lever 24 forwardly from him and in a direction reverse to the biting action of the latch 25, which is used only to lower the frame when released. Extending from the lateral projections of the axle 1 are braces 28, which are connected at their front ends to the tongue for evident purposes, and by suitable attachments draft-securing devices may be applied to the rake.

The operating of the device is as follows: The teeth 18, as shown, are resting against the arms 23, controlled by the lever 21, and are held in this position securely and against movement while the teeth 19 are pulling a bunch of vines. When the bunch is large enough, the lever 21 is operated to release the teeth 18 and the pressure of the vines on the teeth 19 revolves the rake-head 16 until the teeth 20 come against the arms 23, controlled by said lever 21, and after this operation the teeth 18 will be in position to pull and the teeth 19 relieved of the bunch of vines which it has been in engagement with, and so on each set of teeth pulls a bunch. On account of the interval between the let-go of one set and the taking hold of the next the vines of the bunches when left are not all pulled. Consequently all rakes have to run twice over the same row to finish pulling the vines.

The advantages of the present construction are manifold, and among others may be mentioned that the rake does not exert a heavy pull on the team because the teeth, being inclined, very easily break the vines, and, further, the frame of the revolving rake-head being adjustable the teeth are set at will from the ground by the operator and the vines being pulled are lifted and forced to the rake-head, making the vines entirely free from dirt. The weight of the tongue on the neck-yoke is entirely overcome by adjusting the seat to suit the weight of the operator. When the rake is in operation, each set of teeth in turn assumes an upright position under the arch and their sharp ends thrust more or less in the loose ground; but should they strike any hard substance the adjustable frame supporting the rake-head moves upwardly, thereby avoiding all danger resulting from abnormal strain.

Having thus described the invention, what is claimed, and desired to be secured by Letters Patent, is—

1. In a device of the character set forth, the combination with an arched axle and supporting-wheels therefor, of a frame slidably connected thereto, a roller-journal in said frame and having a plurality of series of rake-teeth, a lever fulcrumed to said frame and having its lower end projecting forwardly beneath the frame and provided with laterally-extended arms extending into the path of the teeth for holding them against rotation and for releasing them, a plate upon the frame, a spring disposed between the plate and the lever and adapted to hold the lever in a normal position, a shaft mounted upon the arched axle, two independent hoisting means mounted upon the shaft and connected with the slidable frame to adjust it and the rake-teeth vertically, a toothed segment supported adjacent the shaft, a lever for operating the shaft and having a pawl adapted to engage the teeth of the segment, and means for limiting the movement of the lever and the adjustment of the rake-teeth.

2. In an implement of the class specified, the combination with an axle, of a frame carried thereby and provided with a roller having a series of rake-teeth, a shaft, hoisting devices carried by the shaft and operatively connected with the frame, a lever secured to the shaft and carrying a pawl, a toothed segment the teeth of which are located to be engaged by the pawl, means for limiting the backward movement of the lever to prevent the rake-teeth from coming in contact with the ground, and a lever carried by said frame and provided with an arm disposed in the path of rotation of certain of the teeth, thereby to engage the latter and prevent their rotation, substantially as described.

3. In an implement of the character specified, the combination with an arched axle, of an arch-shaped frame bearing a yieldingly-mounted rake and mounted to move vertically upon the vertical side portions of the arched axle, a single shaft provided with remotely-disposed segments, flexible connections between said segments and the opposite end portions of the arched frame, an operating-lever secured to the shaft for turning it in its bearings for effecting a vertical adjustment of said arched frame, and means for limiting the backward movement of the lever to prevent the rake-teeth from coming in contact with the ground, substantially as described.

4. The combination with a frame, of a rotary rake journaled to the frame, a lever fulcrumed to the rear side of the upper frame-bar and having its lower end extending forwardly beneath the said frame-bar and formed with laterally-extending arms to engage with the teeth of the rake, a plate projecting forwardly from the frame-bar, and a spring interposed between the plate and the forward extension of the lever, substantially as and for the purpose set forth.

In testimony that I claim the foregoing as my own I have hereto affixed my signature in the presence of two witnesses.

VILLIERS COULON DEVILLIERS.

Witnesses:
R. LEE GARLAND,
L. T. CASTILLE.